United States Patent [19]

Hicks

[11] Patent Number: 4,922,481
[45] Date of Patent: May 1, 1990

[54] OPTICAL COMMUNICATION SYSTEMS ENABLING MINIMAL SUBSCRIBER COMPONENTS

[76] Inventor: John W. Hicks, 312 Howard St., Northboro, Mass. 01532

[21] Appl. No.: 99,004

[22] Filed: Sep. 21, 1987

Related U.S. Application Data

[63] Continuation-in-part of Ser. No. 908,362, Sep. 17, 1986, and a continuation-in-part of Ser. No. 761,366, Aug. 1, 1985, Pat. No. 4,778,238.

[51] Int. Cl.⁵ .............................................. H04B 9/00
[52] U.S. Cl. ..................................... 370/4; 350/96.16; 455/612; 455/619
[58] Field of Search ................... 370/1, 3, 4; 455/607, 455/608, 610, 612, 611, 617, 619; 350/96.15, 96.16, 96.14, 96.13

[56] References Cited

U.S. PATENT DOCUMENTS 4,726,010 2/1988 Ali et al. ................................. 370/4

Primary Examiner—Benedict V. Safourek
Assistant Examiner—L. Van Beek
Attorney, Agent, or Firm—Samuels, Gauthier & Stevens

[57] ABSTRACT

A fiber optics communications network system that is adapted for operation with either electrical or optical central office functions, i.e. switching and routing functions, is adapted for connection to electrical or fiber optic conduits for subscriber entrance sites, and which is composed of passive and inert components except for optical modulating devices at communications-transmission stations. The system is characterized by use of a train of pulses supplied to receiver lines and, most advantageously, use of an ancillary pulse in selection and amplification of individual signals for reception by receiver stations and time-division-demultiplexing. In preferred embodiments, the transmission side of the system is assigned a fixed optical frequency address and a fixed time slot is assigned to each transmission station.

3 Claims, 5 Drawing Sheets

OPTICAL COMMUNICATION SYSTEMS ENABLING MINIMAL SUBSCRIBER COMPONENTS

RELATED APPLICATION

This application is a continuation-in-part of U.S. patent application Ser. No. 908,362 filed on Sept. 17, 1986 and entitled OPTICAL COMMUNICATIONS SYSTEM USEFUL WITH METAL SERVICE LINES and of U.S. patent application Ser. No. 761,366 filed Aug. 1, 1985, now U.S. Pat. No. 4,778,238, and entitled OPTICAL COMMUNICATIONS SYSTEMS AND PROCESS FOR SIGNAL AMPLIFICATION USING STIMULATED BRILLOUIN SCATTERING(SBS) AND LASER UTILIZED IN THE SYSTEM.

BACKGROUND OF THE INVENTION

This invention relates to communication systems, such as telephone systems, which utilize fiber optics for transmission and processing of communication signals.

Much effort has been expended in developing components and systems for utilizing the advantages of fiber optics in communication systems. It has been of particular interest to provide systems which can be interfaced into existing telephone systems without requiring replacement of equipment being used by users of the system. Thus, it is desirable that the system be readily interfaced with electrical as well as optical equipment.

Despite substantial progress in the development of optical systems, it has remained desirable to provide versatile, high-capacity, local-distribution communication systems which have a minimum of active components, (i.e. components that require supplemental power;) and which rely primarily on passive components for use off the customer premises. Moreover, whether or not the components be active or passive, it would be desirable to achieve such a system with a minimum amount of apparatus required at each subscriber (i.e. the user or customer) station. Such an achievement would not only minimize unauthorized access to communications but provide a means to reduce the total amount of equipment required by a system to the amount indicated by the statistical analysis of system usage.

SUMMARY OF THE INVENTION

Therefore, it is a principal object of the invention to provide an optical-fiber-based communications system suitable for use in a local distribution system, e.g. the telephone system of a city or town, which system is relatively inexpensive to implement and is based substantially on the use of passive components.

Another object of the invention is to provide a system requiring a simple and inexpensive equipment at the subscriber's stations for receiving signals from and transmitting signals into the system.

A further object of the invention is to provide an optics system utilizing fixed optical frequency addresses (e.g. a synchronous pulse of given frequency for each street line) on the transmission (signal sender's) side of the system.

Another object of the invention is to provide optical communications systems having a minimum amount of distal equipment required, for receiving communications.

Still another object of the invention is to provide a system which allows one to utilize any of a group of addresses within a range of fixed time slots, for a given customer.

Another object of the invention is to provide systems as described above utilizing a high-speed polarization-insensitive piezo electric modulator.

Other objects of the invention will be obvious to those skilled in the art on their reading of the subject disclosure.

SUMMARY OF THE INVENTION

The above objects have been best achieved by a procedure wherein transmitted signals are converted into a train of signal pulses which are provided to a receiver-side of the system and, either at the central office, or subsequently, along street lines. Preferably, selective ancillary signal-amplification means is used to select a signal for a specific receiving station. Highly-efficient time-division-multiplexing is made possible by use of such a signal selector means.

The invention is suitably implemented by assigning a synchronous (sync) pulse of a fixed optical frequency to each street line on the transmit side of the system and removing achromatically part of the sync pulse further removing, again achromatically, part of the modulated signal for transmission to the central office.

At the central office, the signals from the various transmission stations on various street lines are accepted from the sender on transmit lines and optically amplified for transmission to a central office bus where the signals are received through fractional acromatic optical taps.

Then the signals are sent to the receiver side of the system from the central office bus, i.e. to the street line of the receiving station.

In a simple embodiment of the invention, each receiving station has a means to select the frequency channel corresponding to the sender's fixed frequency and removes the entire stream of time slots with that frequency as they are transmitted from the central office bus. (It should be understood that the system also enables the central office to contain much of the selection simple embodiment, each receiving station may consist of a tunable optical filter, (a tuned frequency ring resonator would be one such device) which is utilized to sort out the proper frequencies from those intended for various other street lines and which, for convenience, have been combined on the central bus for transmission to a receiver street line. It is to be emphasized that the optical filter at each receiving station along a street line is selected to remove only a small fraction of the power so that another receiver station further down the receiver line will have functional access to signals on the same channel.

Each receiving station also comprises a detector suitable for detecting a central-office-administered sync pulse leading each sequence of time slots along the receiver line. It is this sync pulse administered by the central office which activates a time-delay-adjustable set for equipment in a given receiving station, at the end of the delay generates a gate through which may pass only a pulse in that time slot determined by the time delay as the appropriate time slot for reception by the particular receiving station. The system allows any receiver to tune to and receive a signal from any transmitter.

In general, the present invention provides a system whereby transmitted signals are subjected to time-division multiplexing and then transmitted as a train of pulses along street lines at fixed frequencies for each street line.

The pulse chain is advantageously modified by use of heterodyne or Brillouin amplification techniques to aid demultiplexing and selection of signals along the receiver side of the system. As is described below, the system, depending on its exact embodiment, allows a great deal of flexibility in the placement of reception-enabling components of the system in either the central office or along the street lines of the receiver side of the system.

The apparatus necessary to implement the function of one or several receiving stations can be conveniently situated on telephone poles, or a like centralized location, away from the receiver's premises since only a single conduit, an electric wire in a common situation, need be used to carry the incoming message to the receiving telephone or other receiving instrument.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

FIGS. 1 and 2.

Figure 7:
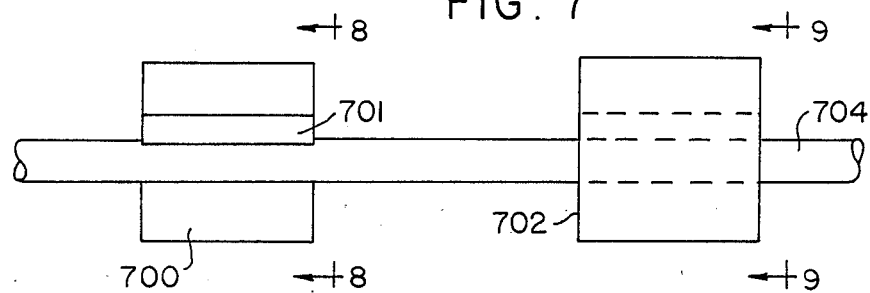
FIGS. 7 through 13 show schematically some rudiments of Brillouin amplification.
Figure 8:
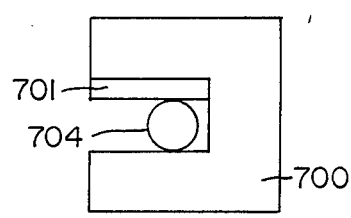
Figure 9:
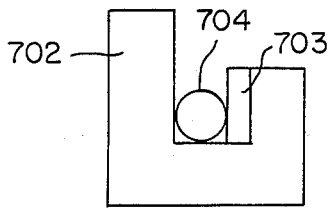

FIGS. 7 through 9 describe piezo vise polarization avoidance means useful in the invention.

Figure 10:
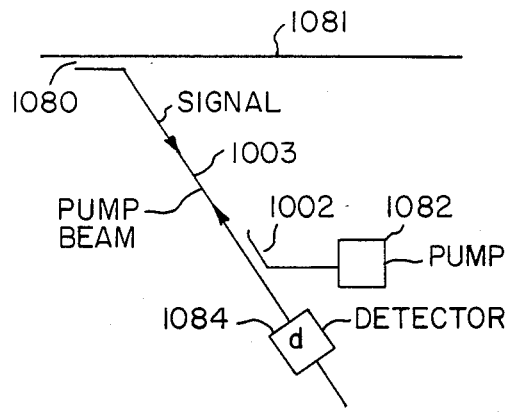

FIG. 10 is a schematic diagram of an optical communications system utilizing a non-frequency-selective, partial power tap and a means for wavelength-selective amplification according to the invention.

Figure 10A:
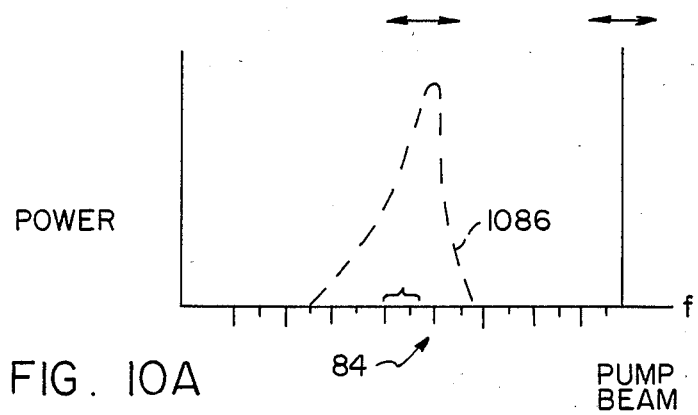
Figure 10B:
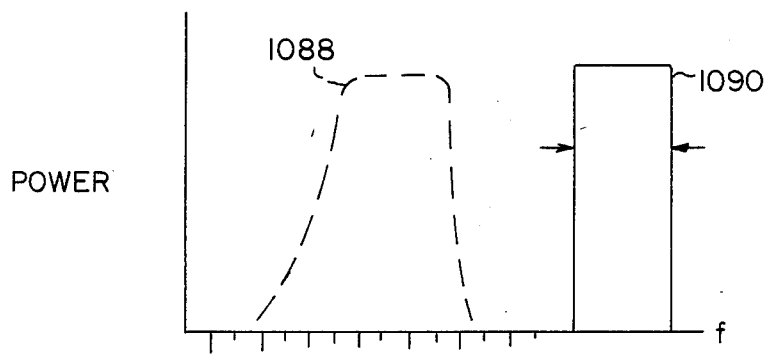

FIGS. 10A and 10B illustrate several aspects of the Brillouin scattering as it relates to the present invention: (a) wherein the signal channels from a trunk line fall under the Brillouin gain curve (10A); (b) wherein the Brillouin gain curve is swept by sweeping the pump beam to provide a wider and more ideal width and wherein shape of a linear-signal curve corresponding to gain curve of (10B) is set out.

Figure 11:
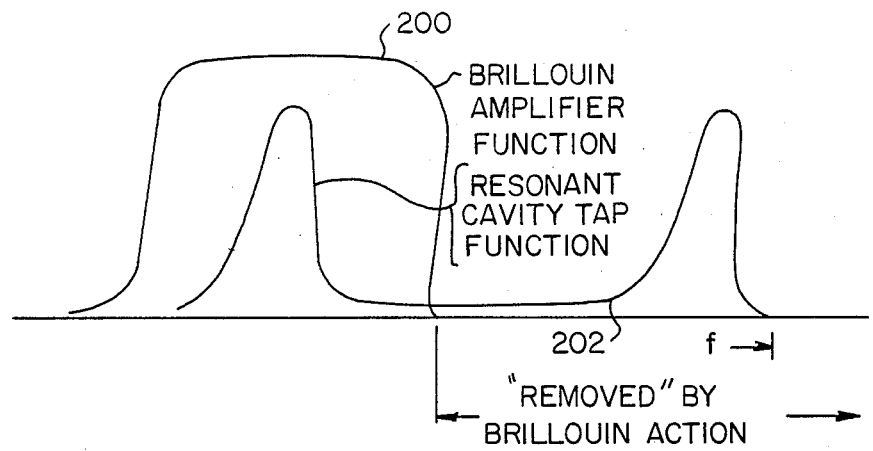

FIG. 11 illustrates schematically how a Brillouin transfer function 200 tends to remove the tail of a resonant cavity (202), thereby performing a useful function in shaping the transfer curve of a resonant cavity tap.

Figure 12:
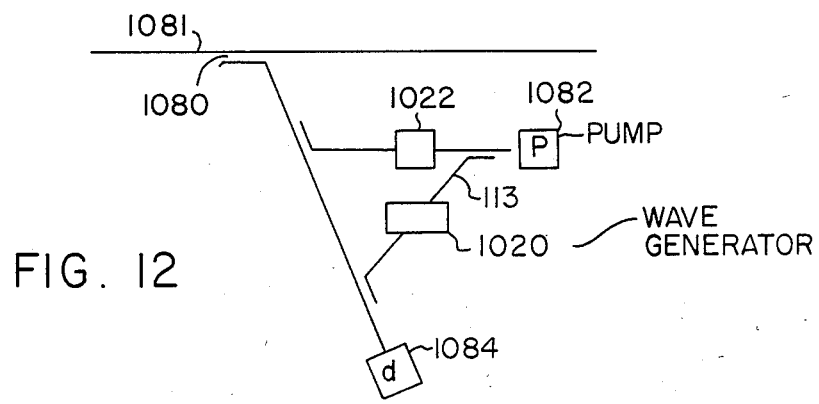

FIG. 12 illustrates a system utilizing a heterodyning procedure whereby the pump beam generated at 282 serves as a local oscillator. In the drawing, 282 is a pump beam, 284 is the detector or receiving station for the signal to be received. That signal is one of many coming down amplifier fiber 206.

Figure 13:
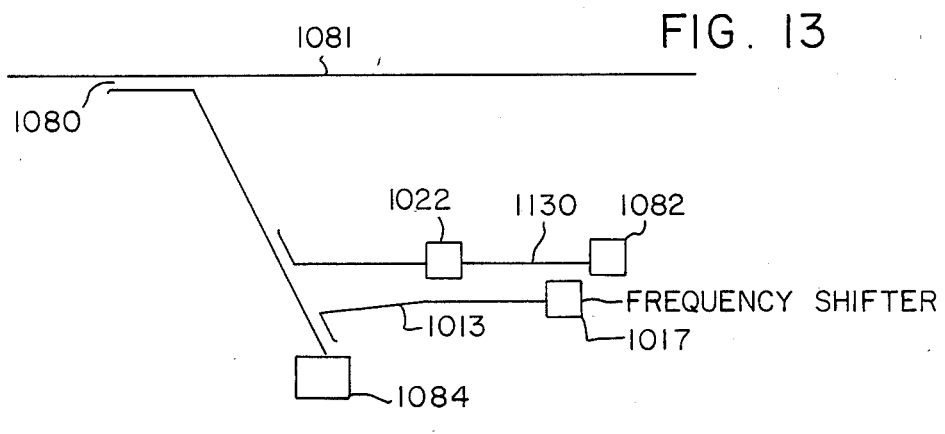

FIG. 13 illustrates, schematically, heterodyning of the pump before frequency or polarization shifting, to reduce the width of the total effective transfer function. FIG. 13 is a schematic diagram of an advantageous system for frequency shifting of the pump (laser) for use in heterodyning utilizing an acoustic wave and a resonant cavity tape 212 to protect the pump (laser) to remove a counter-propagating shifted beam from being directed back into the pump along fiber 113 wherein the resonant cavity is tuned to transfer an unshifted pump wave without sweeping of the resonant cavity tap.

Figure 1:
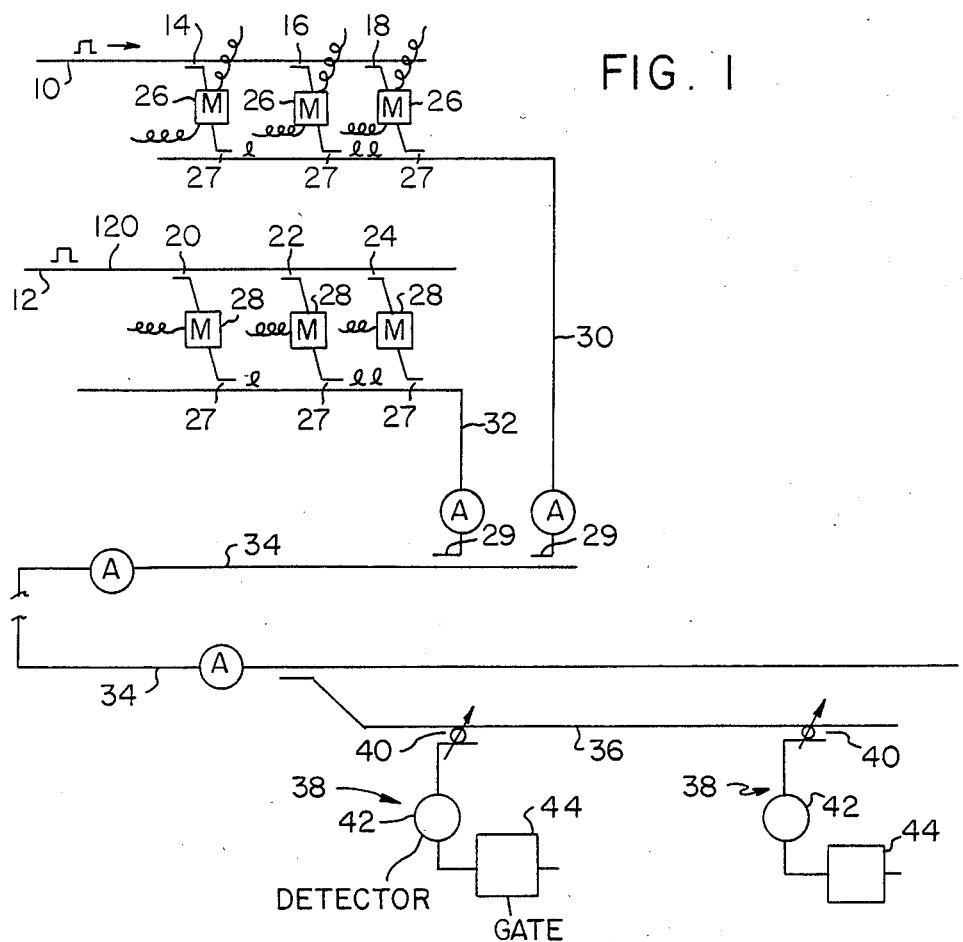
FIG. 1 is a schematic diagram of a system constructed according to the invention.

FIG. 1 is illustrative of such a system as described above. The central-office-administered sync pulse for each street line is assigned a given frequency and moves into a central office function along the appropriate transmit-side street lines 10 and 12. Part of the pulse signal is achromatically removed at optical taps 14, 16, 18 and 20, 22, 24, modulated as indicated at 26 and 28, the modulation being dependent on the incoming signal from the sender's telephone etc.

After modulation, the modulation signal is again passed through fixed partial achromatic taps 27 onto street lines 30 and 32 where extra lengths of inter-station optical fiber 29 (suitably corresponding to the sync pulse length or multiplex itself) serve to provide means to separate the modulated pulses from interfering one with the other as they proceed along the same lines.

The modulated signals then can be amplified on transmitter street lines 30 and 32 where they are combined on a central office bus 34. From bus 34, the signals are sent to street lines, e.g. 36, having a plurality of receiving stations 38, each comprising a tunable optical filter 40, a detector 42 such as a PiN diode, and a gate 44 for admitting the specific signal to be received.

It should be noted that the system of FIG. 1 allows an operating company to place the equipment, short of the actual receiver (e.g. a telephone) away from the receiver's premises, e.g. on a telephone pole with only the communications conduit, say an electrical wire or an optical fiber, extending into the receiver's premises. Also the receiving station apparatus of a large number of stations can easily be placed at the same remote position, e.g. in a common housing with street access for maintenance. This remote placement and grouping can, of course, also be done with the transmission-station equipment of FIG. 1.

Figure 2:
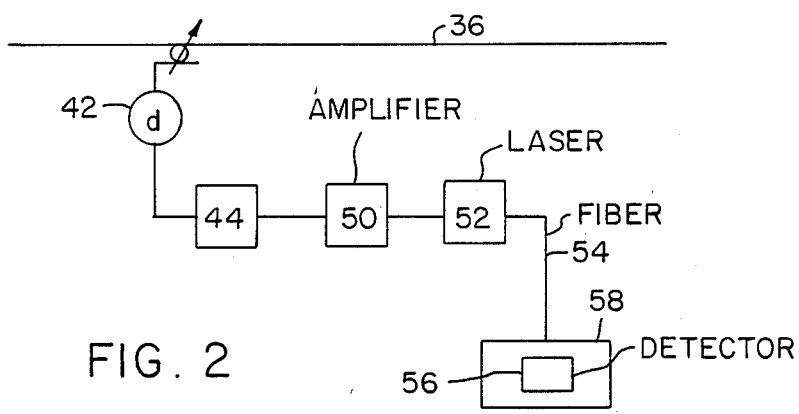
FIG. 2 illustrates, schematically, an optical receiving station useful with the embodiments of the invention described in e.g.

FIG. 2 illustrates how the receiver's stations would be configured if one wished to provide an optical signal to the customer's premises. The electrical signal derived from gate 44 would be amplified at 50, then reconverted to a light signal via LED or laser diode means 52 before being sent through fiber 54 to a detector 56 of a receiving instrument in customer's premises 58.

Similarly, and as known in the art, the sender's signal, could be converted to an optical signal for transmission from the sender to the street line.

Of course, it is to be noted that the conduits carrying signals to and from a customer's receiver/sender device can carry both the incoming and outgoing signals on a single fiber using the various signal multiplexing means known in the art to be efficacious in such 2-way communication.

If it is desired to further simplify the distal equipment on the receiver side of the system, this can be done, using the general system of the invention, by adding some additional central office functions.

For example, consider the situation which one must use, or elects to use, a central office protocol utilizing electrical switching or optical switching followed by reconversion to an electrical signal via a detector diode before retransmission.

In such situations, a series of electrical signals representative of those generated by the sender, are generated by the central office and can be used for modulating the sync pulse before it goes onto the receiver's street line. These modulating signals are used to drive a transmission network suitably located in the central office, rather than located along transmission-side street lines.

Figure 3:
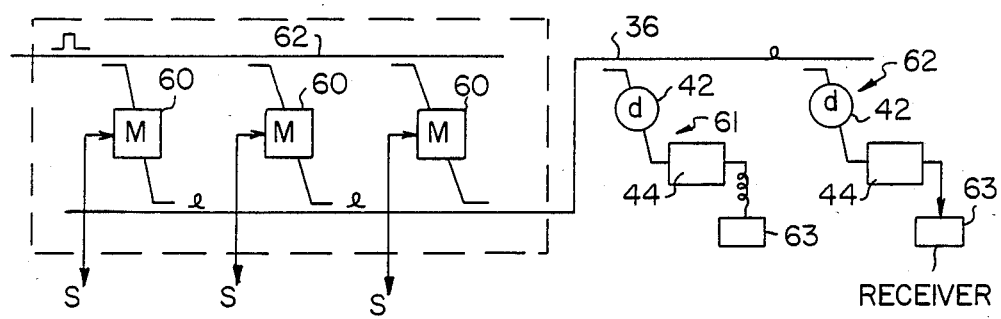
FIG. 3 illustrates, schematically, a system similar to that of FIG. 1 with transmitter-signal modulation in a central office.

Such a transmission network is shown in FIG. 3 and includes the electrical modulating signals derived from the different transmitting stations 'S'. Each such signal acts on a modulator to modulate a central-office-generated sync pulse along a central office line 62 equal to the desired street line frequency of the receiver and supplying the modulated signals to a street line 36. The modulated signals. This modulation procedure assures that the sync pulse, as delivered to the receiver, is always at the same frequency. The receiver stations 61 and 62 will not need an optical filter, merely a optical tap, a detector 42 and gate 44 and a receiving instrument 63.

Figure 4:
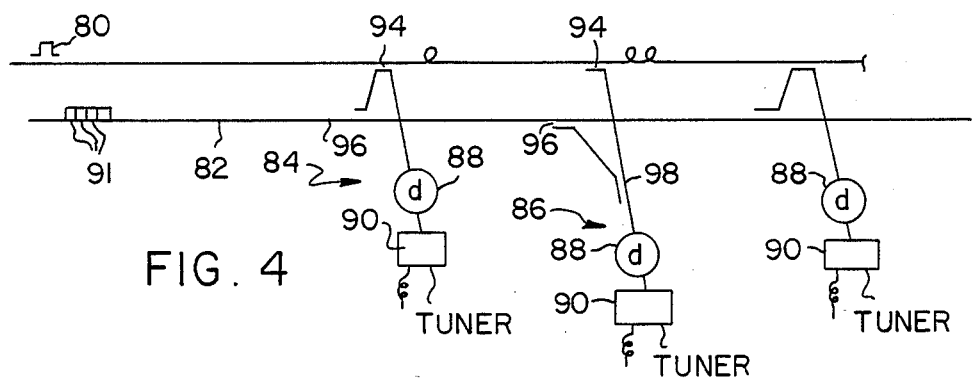
FIG. 4 illustrates, schematically, a system utilizing a heterodyne pulse as a means to selectively enhance and demultiplex a pulse train being delivered to receivers.

FIG. 4 illustrates still another way to take advantage of the general system of the invention, a way that permits eliminating the gate function at the receiving station, is to utilize still another optical sync pulse, an amplifying pulse, to heterodyne with the frequency of the optical signal frequency proceeding from the central office along the street line. This heterodyne pulse will be selected, most effectively, to have the same pulse width as the time slots 90 of the signals coming from the central office to the street line 82 on the receiver side.

The heterodyne pulse 80, conveniently, is made synchronous with the first signal time slot at a first receiver station 84, synchronous with the second time slot at a second receiver station 86, etc. along a given street line on the receiver side of the system. This heterodyne pulse is an amplifying pulse with e.g., about 100 to 1000 times greater power than the signal pulse derived from the communication signal being transmitted to the street line side of the system at the central office.

Still referring to FIG. 4, it is pointed out that typical optical tap values of the achromatic taps are one percent for tapping the optical heterodyne and street line signals as at 94 and 96. If the street signal is subsequently tapped as at 98, a much higher tap of optical power, e.g. 50%, is allowable.

This system allows the receiver station 84 to 86 to omit the electrical gate circuitry by utilizing, with the detector 88 for each receiving station, a "beat" tuning means 90 for admitting the frequency resulting from the interaction, i.e. the beat frequency, between the central-office-generated heterodyne 80 and street line signal pulses comprising time slots 90.

Figure 5:
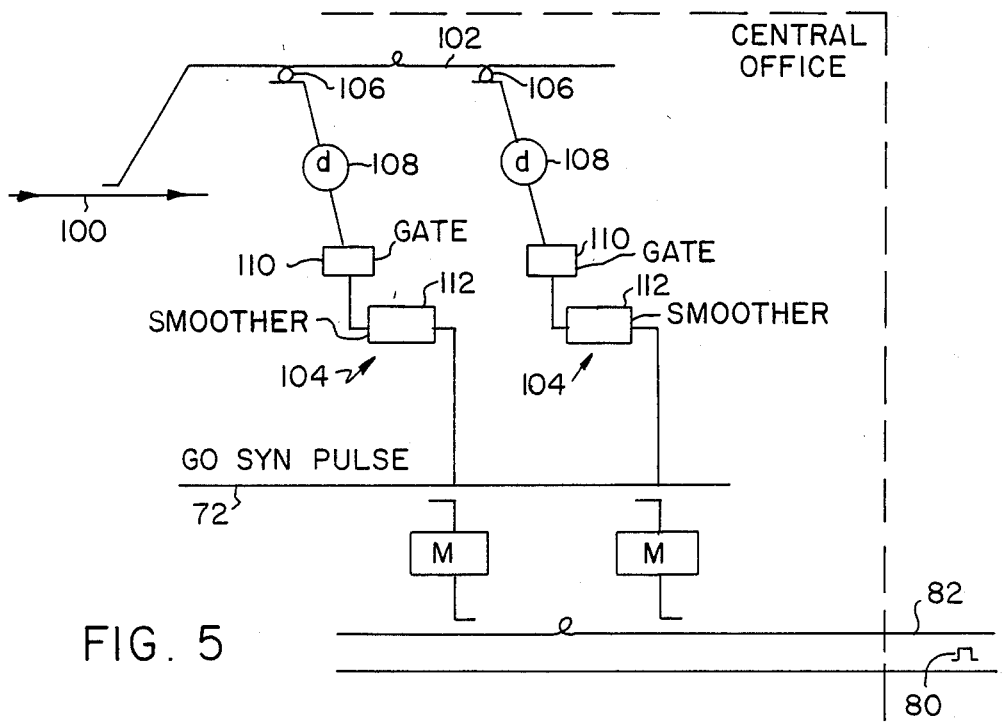
FIG. 5 illustrates, schematically, an optically-modulated system utilizing a smoothing and resampling feature with a heterodyne pulse circuit.

If the central office switch is an optical switch from which one obtains modulating signals, e.g. signals for use in heterodyned receiving lines, the receiving circuitry (as used in the distal circuitry of FIG. 1) can be incorporated into the central office's internal signal-processing apparatus. Thus, as seen in FIG. 5, the optical signals provided from the optical switch are fed from a central office bus 100 to an internal receiver circuit 102 at the central office. This circuitry 102 comprises a plurality of optical modulating circuits 104 comprising means to select and transfer signals to the receiving line whence they will be subjected to heterodyning as discussed above. Ideally, one modulating circuit is provided for each receiver station. A smaller number is often statistically suitable to the operator of a communications systems.

Each optical modulating circuit is comprised of an optical filter 106 such as a ring resonator-type tuner which is a means to select the frequency channel and the entire group of time slots therein corresponding to that used by the sender; a detector 108 for sensing the appropriate sync pulse in each time slot, a gate circuit 110 for passing of the appropriate pulse in the appropriate time slot, and an optical-signal smoothing means 112 such as an R/C circuit resistive-capacitive removes $\frac{1}{2}$-frequency components. The smoother 112 functions to modify the gated signal (which comprises a series of pulses having the same repetition rate of the sync pulse) from the transmission side and "smooth" these signals to a relatively continuous signal. It is this relatively smooth signal which is used, in connection with a pulse supplied from central office along a line 62, as a modulating signal for modulation and transmission to a receiving street line and heterodyning as described in FIG. 4. Thus, substantially less distal equipment is required in the system.

In systems as described herein, wherein both the receiving side of the system and the transmission side of the system have fixed time slots, there is a need to coordinate the two systems.

In this optically-modulated system of FIG. 5, it is necessary to smooth and then resample the signal. A resulting decrease in bandwidth between original and resampled signal will present no real problem in many communication systems, because the present system can easily carry far wider bandwidth than is required by the receiver. For example, in digital systems the synchronous pulse repetition rate is always at least 3 or 4 times greater than an original bit rate being sampled asynchronously.

Thus, the use of the amplifying heterodyne pulse circuits described herein allows removal of the gate function from the distal components of a system and the positioning of signal-selection apparatus within the central office without losing the ability to transmit the signal by either electroconductive wire or optical fiber, without rebroadcasting and without customer's being able to receive improperly-routed signals. Also, the central-placement of the apparatus allows a more efficient allocation of resources by the operator of the communication systems. Thus, if it realizes that it need provide equipment for servicing only a small fraction of the receiving stations at any one time, it can substantailly reduce the amount of equipment and increase the capacity from time to time at the central switching and routing office.

Similarly, the operator of the communication system can more readily install a fiber optic distribution system while continuing use of electrical switching at the central office. Moreover, such a system can be readily upgraded by use of an optical switch.

The general system of the invention can be made still more elaborate and can accomodate different protocols when the specifications of a communication system so require. There are substantial advantages in such systems.

Thus, for example, the systems described above are suitably operated at a street line (transmit side) rate of $3 \times 10^9$ bits per second, for example. Such systems may be 50 customers and have a repetition rate of $6 \times 10^7$ per second.

The use of a fundamental repetition rate of $10^5$ bits (pulses) per second wherein each transmitting station is sampled at a rate of $10^5$ times per second, at least is advantageous: The sweep cycle is greatly extended; i.e. to 600 times the original cycle in the illustrated instance. This longer cycle can be of major advantage, in the general system of the invention, in a number of ways:

It can enable a system to use a single, first, sweep of 50 pulses to be sent to a first street line, a second sweep of 50 pulses to be sent to a second street line, and so on up to the 600th street line. All of these street lines can be operated on the same optical frequency. (However, central office protocols must make provision to synchronize the street lines to accomodate formation of a series long bit streams of $3 \times 10^4$ time slots without collision.) This is readily within the present skill and knowledge of the art.

Another advantageous use of a longer cycle time is to use it to increase the signal-sending capabilities of the transmitters. Thus, if one uses the $6 \times 10^7$ repetition rate, each sweep can be routed by a central office-directed protocol to a single transmitting station. Such an arrangement would permit transmission of a plurality of video-phone signals or 600 voice signals (or any combination of such signals that does not exceed $6 \times 10^7$ samples per second and can be properly factored into the $6 \times 10^7$ pulse repetition rate. A requirement for protocol for use with such a system would be to provide pre-multiplexing (time-division) before transmission of the signal to the transmission modulator.

Some emphasis has been given to digital transmission because this mode is often favorable, particularly with computer systems and the like. Too, if a signal to be transmitted requires a great deal of amplification or is to be converted back and forth from optical to electronic form, it is usually desirable to digitize the signal to be transmitted. Nevertheless, it will be understood that the signal can be transmitted as a "time-slice" analog signal. The time-slice samples which are transmitted as a series of individual signals of varying amplitude. Such analog-type transmission is satisfactory for voice transmission at about $10^5$, or fewer, samples per second. Video-phase transmissions would be suitable at, e.g. $10^7$, or fewer samples per second.

The advantage of such a multiple-sweep system extends to the reception side of the system. For example, in a system wherein the central office provides a electrical signal to modulate a fixed frequency on a receiver's street line, then a given receiver station can serve to receive a number of different communication signals. The receiving equipment advantageously provides signal-discrimination between each sweep of the 600 sweeps of the fundamental repetition.

It is also to be understood that signal amplification can be achieved on the receiver side, either at the central office or in the distal equipment by utilizing back-scattered Brillouin amplification rather than, for example, a more conventional heterodyne amplification.

Figure 6:
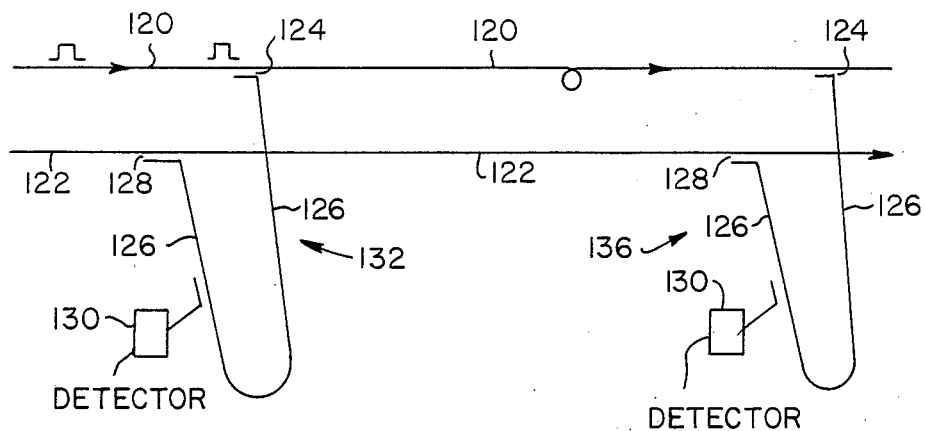
FIG. 6 illustrates, schematically, a system using a Brillouin amplification means in the demultiplexing function.

As shown in FIG. 6, the demultiplexing and selection of a signal in the time-division-multiplexed train of signals moving along optical fiber 120 can be also enhanced by use of a Brillouin amplification procedure.

The Brillouin pulse can be provided along an ancillary optical fiber 120. It is achromatically, and partially, tapped at 124 and fed in a backward direction through a Brillouin amplification fiber 126. A portion of the time-division-multiplexed signal train in fiber 122 is also achromatically and partially tapped, at 128, and is met and amplified with the Brillouin back scatter. The signal, so amplified, can be passed to a receiver's detector at 130.

As with most other embodiments of the invention, adjacent receiving stations 132 and 136, are offset fiber loops to assure discrimination between signals at adjoining stations along the same receiver street wire, i.e. to achieve the desired step back to select proper time slots for a given station.

Power required for a Brillouin amplification of this type is, typically, about 1 milliwatt per station.

It is, of course, to be recognized that the transmitting and receiving station could be any manner of station. Thus, communications from telephones, computers, devices associated with meters of various sorts and transducers associated with processing equipment or storage equipment all could be serviced by a system as described herein.

It is also to be understood that the system defined herein is descriptive of the sending of a signal from a transmitter, through a routing and switching station, to a receiver. Those skilled in the art will understand that many communications systems, certainly conventional-telephone systems, will necessarily include additional hardware which is like a "mirror-image" of the illustrated system and which carries the other half of a two-way conversation, that is, it allows the receiver station described herein to communicate with the transmitter described herein.

POLARIZATION COMPENSATION BY PIEZO VISES

The modulator means may be relatively simple piezoelectric clamps as are described in FIGS. 7 through 9. The piezoelectric nature of the clamp will allow it to squeeze the optic fiber, say along a length of about one centimeter, to a degree proportional to the voltage input of the communication and obtain a variation in the optical signal transmitted through the fiber which is an optical representation of the communication. This is adequate in polarization maintaining systems. However, when ordinary, monomodal, optical fiber is used, slight pertubations caused by small strain of the fiber will also effect polarization characteristics of the light reaching the modulator. The polarization state of the optical signals at the output of a piezomodulator does not match the polarization state at the input of modulator unless the light is polarized along an axis of the vise.

Therefore, as seen in FIGS. 7 through 9, piezovise-type modulators are often to be based on the use of multiple-vise systems whereby a modulator system is provided which will transfer a fraction of the power in the $P_o$ pulse without dependence on the state of polarization of $P_o$ signal as it reaches and passes through, or is processed in, a given transmitting station.

Piezoelectric modulators, really variable-pressure clamps, can serve to modulate the optical signal into the electrical pulses received from the electrical pulses received from the electrical transmission wires leading from the transmitter. They produce an optical phase change predominantly for a polarization state in which the electric vector is along the squeeze axis.

A preferred modulating means uses a plurality, e.g. two, of compensating piezo clamps arranged at preselected angles, e.g. 90 degrees, one to the other. See FIGS. 7, 8, and 9.

As seen in FIG. 7, modulating clamps 700 and 702 of FIG. 7 are operated with driving voltages on each clamp adjusted to assure equal modulation on each device. This is a state determined by rotating a plane polarized input beam and adjusting the drive voltage ratio between paired piezo modulators until there is no variation in the modulation of the signal as the polarization plane rotates. In the device 706 shown in FIGS. 7, 8, and 9, the fiber 704 is being clamped, at angles differing by about 90 degrees by piezo clamps 700 and 702. As a practical matter it is probably simple enough to manufacture pre-adjusted pair devices, or pre-adjust them in the factory, before delivering them to the site of installation into a communications system. It is to be noted that the actual material upon to which the voltage is applied is pad 701 and 703. Electrodes are normally attached to each face of the pad. The voltage-induced pressure-squeeze on the optical fiber creates a controlled change in optical path length which for the maximum signal voltage and given the vise length, typically about a centimeter, is of order one wavelength.

BRILLOUIN AMPLIFICATION

This invention, in one advantageous embodiment, utilizes Stimulated Brillouin Scattering, e.g. back-scattering, as an amplification and channel selection means.

Also, it involves use of Brillouin Back Scattering as a heterodyning technique as well as normal heterodyning procedures. These techniques are first described in Applicant's co-pending application Ser. No. 761,366 filed 1 August 1985 which is incorporated herein by reference.

The Brillouin Back Scattering per se has been known in the art for sometime and has been utilized in providing oscillation for optical gyroscopes. More recently, the use of such amplification has been disclosed in a paper by Chraplyvy et al entitled "Narrowband Tunable Optical Filter or Channel Selection in Densely-Packed W.D.M. Systems" published in Optical Fiber Communication Inst. of Optical Communications. That paper cites a paper by Olsson et al (1986) which appeared in Electron Lett 22, 488 (1986).

Also see the following publication wherein Brillouin amplification of one sort or another has been described in "Electronics Letter", Volume 22, No. 9, in an article entitled Fiber Brillouin Amplifier With Electrically-Controlled Bandwith; in "Electronics Letter" of May 8, 1986, Volume 22, Pages 556–577 in an article entitled Application of Brillouin Amplification in Coherent Optical Transmission; and in "Electronics Letter" of June 5, 1986, Volume 22, No. 42 entitled Influence of Nonlinear Dispersion in Coherent Narrowband Amplification by Stimulated Brillouin Scattering.

In general, a laser pump, or some other primary source of narrow-spectral light of sufficient power, is used as a power source for the amplifier. The optical amplification process is achieved within the transmission fiber, e.g. the line between an incoming trunk line and a receiver, by making use of backward-wave stimulated Brillouin scattering, i.e. the pump feeds energy back along the transmission path toward the incoming signal to be amplified.

When utilized as the primary means of channel selectivity, backward Brillouin amplification will require relatively high power because of the spectral width ($5 \times 10^8$ pulses/sec) chosen herein as the line rate. The Brillouin width at a wavelength of 1.3 microns is of the order of $2 \times 10^7$ Hertz. The required power goes up in the ratio of $5 \times 10^8 : 2 \times 10^7$. Thus, the laser pump frequency scanning must be used to transfer the high line rate.

In FIG. 10 there is seen that it can be more specifically described as a single detecting or receiving station 1084, but explicitly showing a pump signal source 1082 as a means used to control the stimulated backward Brillouin scattering. As indicated, pump beam opposes the signals being tapped from the trunk line 1081 and fed along amplifying fiber 1003. Pump tap 1002 is designed to deliver about 90% of the pump signal to amplifier fiber 1003. This also leaves 10% of the signal for the detector. This is quite adequate because 30 to 80 decibels of amplification is typical. The trunk tap 80 is 1% (−20 db.). Therefore, the net gain of the illustrated tap device is 30 to 80 minus 30 db., but adjusted to be great enough to raise the signal at the detector 1084 well above the dark noise of the detector. Although the net gain is reduced by tap losses, the total Brillouin gain independent of losses is effective in differentiating the selected channel from other channels.

The type of tap illustrated at FIG. 4 can be combined with previously-known resonant cavity filters placed either in the tap 1080 or pump tap 1002. This would be done, when the incoming signal power to be detected is too low and the use of a wavelength selective tap would serve as a means to permit transmission of increased power into the amplifier.

In this connection,, it is noted that when the channel width to be detected is less than the Brillouin gain curve width, e.g. as illustrated in FIG. 10A, it is possible to use a resonant cavity-type tap (of the type already known in the art) either at the tap into the trunk line (at 1003) or the tap between the amplifier and the detector (at 1002) to further reduce the width of the gain curve transfer function, defining power amplification as a function of optical frequency difference between said incoming signal and said control beam. Even in a circumstance, wherein the transfer function remains wider than the channel being detected, the Brillouin-type amplification is of value, because it functions as a means to improve the shape of the gain curve by obviating the effects of the "tails" on the transfer functions that normally characterize single stage resonant cavity taps.

Resonant cavity taps need not be used in such "narrow-channel" circumstances. A heterodyning system may be used as in shown in FIG. 10. FIG. 12 illustrates a tap system, where not only is the pump frequency shifted (or switched between discrete frequencies) but a fraction of the beam from pump 1082 is diverted, before it has been subjected to any broadening by frequency shifting, to the detector 1084. Thus, the pump 1082 may serve as a local oscillator beam along fiber 1013 in a heterodyne system whereby the pump beam has the additional function whereby it is a means to combine with the incoming signal which is to be detected and received. The superimposition of these signals generates a so-called "beat" signal pattern which is a function of time, the beat frequency being equal to the different in frequency between the incoming signal and the local oscillator. As is known in the optical instrumentation art, the resultant complex signal can be filtered electronically to detect the beat frequency. The local oscillator signal is introduced at much higher power than the incoming signal to be detected and thus provides additional gain. This simple heterodyning procedure allows detection of relatively narrow channels, but pump noise and detector non-linearity and noise limit the ability to separate clearly a selected channel from a large number of channels. As an approximate rule heterodyning can be used to select one channel from 10 to 20 adjacent channels.

When the pump beam is used as the local oscillator beam as generally shown in FIG. 12, the frequency difference between pump and incoming signal, often about $10^{10}$ Hertz, may be somewhat too high for some commercial detectors, although commercial PIN detectors are suitable in some applications. When it is found that a given detector will not respond adequately to this rather high difference in frequency, the pump, i.e. local oscillator, frequency can be shifted by a means 1020, e.g. acoustic-travelling wave generating means known in the art. The choice between a more suitable detector or employment of such a means will usually be based on economic considerations.

When one decides to employ a down-shifting of the pump frequency, one may use a frequency-shifting means 1020. One such means may generate acoustic waves either counter to or concurrent with the local oscillator beam 1013, shifting the optical frequency up or down, respectively. Whether shifted up or down, however, the shifted pump beam is reflected counter to the original optical (pump) beam. Therefore, it is often desirable to avoid the inefficiency inherent in such counter reflection and to remove the shifted beam. A nonselective tap would not be a preferred means for performing this function in most circumstances because of the substantial inherent loss of efficiency in the pump system. Therefore, use of a resonant cavity tap is usually justified in such a system as described above.

However, if the acoustic generator is swept to broaden the gain curve of any such resonant cavity, its transfer curve function must be broad enough to accomodate the swept range or must be synchronously swept to stay in tune with the down-shifted beam. Referring to FIG. 13, it is seen that this necessity is avoided by utilizing the resonant cavity filter tap 1130 as a means to transfer the pump beam before the beam is shifted. Thus, a heterodyning system such as is shown in FIG. 12 avoids the need to modify or sweep the gain curve of the resonant cavity tap. The resonant cavity tap is tuned to transfer an unshifted pump wave and the tape itself need not be swept. A frequency shifter 1017 is used of the acoustic generator type.

For perfect phase matched reflection during heterodyning, an acoustic wave from the pump needs to have a wavelength of one half the optical wavelength (in the fiber). In the illustrated case, the frequency shift is equal to the Brillouin shift. The produce a shift slightly removed from the Brillouin shift, for example, by $10^8$ Hertz, one simply changes the acoustic frequency, but at some sacrifice in reflectivity since the phase match is not perfect. To function well, in such a situation, the interaction length should be less than 100 wavelenghts. To produce a greater shift in the acoustic wave than this, one brings the acoustic wave in to the fiber at an angle. The acoustic frequency is increased by fixing the angle such that the projection of the acoustic wavelength along the fiber is again phase matched. This allows adjustment of optical frequency shift either up or down in absolute amount greater than (but not less than) the Brillouin shift. Thus the shifted pump frequency lies on the opposite side of the signal from the pump frequency.

Another procedure for achieving phase matched operation, preferred because of its simplicity, is to squeeze or stretch the fiber, as by piezoelectric vise means as shown above, to change the optical wavelength (in vitro) and then alter the acoustic wavelength and its reflection to stay phase matched with the pump beam. This allows a modest shift in either direction from the natural Brillouin shift and produces a useable beat frequency for heterodyning.

U.S. patent application Ser. No. 761,366 entitled IMPROVED OPTICAL COMMUNICATIONS SYSTEMS and filed 1 August 1985 and 908,362 entitled OPTICAL SYSTEM USEFUL WITH METAL SERVICE LINES and filed 17 September 1986 are incorporated by reference into this Specification.

HOUSEKEEPING

Various kinds of information must be transmitted within the system to assure proper control and co-ordination. This information may be thought of "broadcast administration" or "broadcast housekeeping" information. Distribution of such information can be carried out in a number of ways. For example, it is convenient to reserve the first pulse in each series of pulses. Also, one or more time slots can be dedicated to carrying such information.

For example, on the receiver side of the system, the central office instructs a specific receiving station, say a Station 38 on a street line D, to receive a call coming in, on pulse position 84 by sending out, onto street line D and in a first pulse position, the number 38 (binary form) followed by the number 84 (binary form). The receiver equipment responds to its name (38) and adjusts its time delay, using the sync pulse as a basis therefor, to select time slot 84.

Similarly, each transmitter station can use a designated time slot to send request and routing information to the central office, e.g. time slot one and in a frequency channel provided specifically and continuously for receiving and transmitting request and routing information.

Those skilled in the design and function of complex communications systems will be able to devise a number of means for providing the necessary administrative control of the system.

It is also to be understood that the following claims are intended to cover all of the generic and specific features of the invention herein described and all statements of the scope of the invention which might be said to fall therebetween.

What is claimed:
1. An optical communication system comprising:
(a) means for receiving incoming communication signals from a transmission side of said system;

(b) means for converting said incoming signals to a train of time-divided optical multiplexed signals at a common optical frequency;
(c) means for transmitting said multiplexed signals to a street line on a receiver side of said system, said street line servicing a plurality of receiver stations; and
(d) means for demultiplexing said time-divided multiplexed train of optical signals and delivering a component of said signals to a receiver station preset to receive a signal from one said time slot in said train, said demultiplexing means comprising:
(e) means to provide a heterodyne pulse;
(f) partial achromatic tap means for removing a portion of the power each of
  (1) said multiplexed signals; and
  (2) said heterodyne pulse;
(g) means to combine the partial taps of said heterodyne and said multiplexed signal power into a single optical fiber for transmission to a plurality of receiver stations along a street line and for each receiver station along said street line;
(h) means to detect the combined heterodyne and multiplexed signal portion;
(i) electronic means for monitoring said detected signal and selectively passing a beat frequency corresponding to the difference in frequency between said heterodyne and multiplexed signal portions;
(j) means to coordinate synchronicity of heterodyne pulse with said time slot of said signal pulse which is to be selected for a receiver station; and
means between receiving stations to produce a shift in synchronicity such that said heterodyne pulse is synchronous with the time slot to be selected for transmissions to another receiver station further down said street line.

2. A system as defined in claim 1 wherein all multiplexed signals are transmitted to a street line at a single frequency.

3. An optical communications system as defined in claim 1 wherein said demultiplexing means comprises;
  (a) means to provide a source of Brillouin pulse;
  (b) partial achromatic taps for conveying each of said time-divided multiplexed signal and of said Brillouin pulse onto a Brillouin amplification fiber; and
  (c) means to combine said Brillouin pulse and said multiplexed signal such that said pulses are moving in opposite directions along an amplification fiber.

* * * * *